United States Patent
Jia et al.

(10) Patent No.: US 12,079,647 B2
(45) Date of Patent: Sep. 3, 2024

(54) ENCODING SCHEDULING METHOD, SERVER, CLIENT, AND SYSTEM FOR ACQUIRING REMOTE DESKTOP

(71) Applicant: ALIBABA GROUP HOLDING LIMITED, Grand Cayman (KY)

(72) Inventors: Xianghong Jia, Hangzhou (CN); Hongbo Min, Hangzhou (CN); Xiang Hu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 18/184,204

(22) Filed: Mar. 15, 2023

(65) Prior Publication Data

US 2023/0221969 A1     Jul. 13, 2023

Related U.S. Application Data

(63) Continuation of application No. PCT/CN2021/117361, filed on Sep. 9, 2021.

(30) Foreign Application Priority Data

Sep. 16, 2020    (CN) .......................... 202010973546.0

(51) Int. Cl.
     *G06F 3/048*        (2013.01)
     *G06F 3/14*          (2006.01)
     *G06F 9/451*        (2018.01)

(52) U.S. Cl.
     CPC ............ *G06F 9/452* (2018.02); *G06F 3/1454* (2013.01)

(58) Field of Classification Search
     CPC .......... G06F 9/452; G06F 3/1454; G06F 9/50; G09G 5/001; G09G 5/363; G09G 2360/04;
(Continued)

(56) References Cited

U.S. PATENT DOCUMENTS 9,286,082 B1 *   3/2016   Hobbs ..................... G06F 9/452
9,704,270 B1 *   7/2017   Main ....................... G06T 15/60
(Continued)

FOREIGN PATENT DOCUMENTS

CN      101835043 A     9/2010
CN      104994407 A    10/2015
(Continued)

OTHER PUBLICATIONS

PCT International Search Report and Written Opinion mailed Dec. 8, 2021, issued in corresponding International Application No. PCT/CN2021/117361 (14 pgs.).

(Continued)

*Primary Examiner* — Rashawn N Tillery
(74) *Attorney, Agent, or Firm* — Finnegan, Henderson, Farabow, Garrett & Dunner, LLP

(57) ABSTRACT

An encoding scheduling method, a server, a client, and a system for acquiring a remote desktop are provided. An encoding scheduling method includes: determining, by a server, encoding requirement information of an encoding task according to information reflecting a remote desktop creation requirement; and calling hardware encoding resources according to the encoding requirement information of the encoding task, to implement encoding of the encoding task.

20 Claims, 2 Drawing Sheets

(58) Field of Classification Search
CPC ........... G09G 2360/06; G09G 2360/08; G09G 2370/20; H04N 21/2343
See application file for complete search history.

(56) References Cited

U.S. PATENT DOCUMENTS

| | | | | |
|---|---|---|---|---|
| 10,045,089 | B2* | 8/2018 | Jeong | H04N 21/6547 |
| 10,771,393 | B1* | 9/2020 | Korobov | H04L 67/133 |
| 11,223,838 | B2* | 1/2022 | Chen | H04N 19/124 |
| 11,556,382 | B1* | 1/2023 | Byagowi | G06F 9/4881 |
| 2008/0162713 | A1* | 7/2008 | Bowra | H04N 21/4344 709/231 |
| 2012/0218292 | A1* | 8/2012 | Nyczyk | G06F 3/1462 345/418 |
| 2012/0311564 | A1* | 12/2012 | Khalid | G06F 8/61 718/1 |
| 2014/0286438 | A1* | 9/2014 | Apte | H04L 65/80 375/240.26 |
| 2015/0375112 | A1* | 12/2015 | Garden | H04N 21/2405 463/31 |
| 2017/0142432 | A1 | 5/2017 | Wei et al. | |
| 2017/0201563 | A1* | 7/2017 | Wang | H04L 65/65 |
| 2018/0063555 | A1* | 3/2018 | Raduchel | G06F 9/452 |
| 2018/0373546 | A1* | 12/2018 | Abiezzi | G06T 9/00 |
| 2020/0029086 | A1* | 1/2020 | Zou | H04N 19/436 |
| 2022/0023755 | A1* | 1/2022 | Vukojevic | H04L 67/63 |
| 2022/0029906 | A1* | 1/2022 | Mahesh | H04L 41/14 |

FOREIGN PATENT DOCUMENTS

| | | | | |
|---|---|---|---|---|
| CN | 106681679 | A | | 5/2017 |
| CN | 107295340 | A | | 10/2017 |
| CN | 107766227 | A * | | 3/2018 |
| CN | 108322781 | A * | | 7/2018 |
| CN | 110868599 | A | | 3/2020 |
| CN | 111010582 | A | | 4/2020 |
| CN | 111246084 | A | | 6/2020 |
| WO | WO-2012082589 | A2 * | 6/2012 | ............ G06F 9/38 |
| WO | WO2022057718 | A1 | 3/2022 | |

OTHER PUBLICATIONS

First Chinese Office Action issued in corresponding Chinese Application No. 202010973546.0 on Mar. 29, 2023 (7 pages). not available.

* cited by examiner

ENCODING SCHEDULING METHOD, SERVER, CLIENT, AND SYSTEM FOR ACQUIRING REMOTE DESKTOP

CROSS-REFERENCE TO RELATED APPLICATIONS

The present application claims priority to International Application No. PCT/CN2021/117361, filed Sep. 9, 2021, which claims priority to and the benefits of Chinese Patent Application Serial No. 202010973546.0, filed on Sep. 16, 2020, both of which are incorporated herein by reference in their entireties.

TECHNICAL FIELD

The present disclosure relates to, but not limited to, cloud desktop technologies, and in particular, to an encoding scheduling method, a server, a client, and a system for acquiring a remote desktop.

BACKGROUND

A cloud desktop is also referred to as desktop virtualization or a cloud computer, which is a new mode to replace a conventional computer. Based on the use of the cloud desktop, a user no longer needs to buy a computer host. The CPU, internal memory, hard disk, and other components included in the computer host can be virtualized in a back-end server. After installing a client terminal, the user accesses a virtual machine on the back-end server through a relevant communication protocol to implement an interactive operation, so as to achieve the same experience effect as that from the computer. The cloud desktop not only supports the use for replacing the conventional computer, but also supports the use for replacing other intelligent devices such as a mobile phone and a tablet to access the Internet. It is also the latest solution for remote working. At present, one of the mainstream technologies in cloud desktop products is that a server terminal encodes a desktop image into a video stream format, and then transmits the encoded desktop image to a client terminal for display through a network. In order to improve encoding efficiency and avoid excessive consumption of the CPU of the server, a hardware encoder is usually introduced to the server. The hardware encoder refers to a hardware unit using heterogeneous computing chips for video encoding, such as a Graphics Processing Unit (GPU), a Field Programmable Gate Array (FPGA), an Application-Specific Integrated Circuit (ASIC), etc.

FIG. 1 is a schematic diagram of a typical architecture of a cloud desktop in the related technology. As shown in FIG. 1, a typical architecture of the cloud desktop includes a server, a hardware encoder, and a plurality of clients. The client interacts with the server, including requesting to create a remote desktop and connect to a remote desktop, through a network protocol. The server encodes image data of the desktop into a video stream, and then transmits the video stream to the client making the request through the network. Each client occupies one channel of resources of the hardware encoder on the server side. In this architecture, because the quantity of channels supported by the hardware encoder of the server is limited, in the case that the resources are limited, the quantity of client connections supported by one server is determined by a specification of the hardware encoder. For example, in a case that the hardware encoder supports 24 channels, the server can support 24 concurrent client connections at most. Moreover, for a user scenario of the cloud desktop, the frequency of a desktop change is not high. That is, although each client occupies one channel of encoding resources, the load is not large, which causes a lower hardware encoder utilization and leads to a waste of resources.

SUMMARY

Embodiments of the present disclosure provide an encoding scheduling method. The encoding scheduling method includes: determining, by a server, encoding requirement information of an encoding task according to information reflecting a remote desktop creation requirement; and calling hardware encoding resources according to the encoding requirement information of the encoding task, to implement encoding of the encoding task.

Embodiments of the present disclosure provide a server. The server includes one or more processors and a memory storing one or more programs executable by the one or more processors to cause the server to: determine encoding requirement information of an encoding task according to information reflecting a remote desktop creation requirement; and call, according to the encoding requirement information of the encoding task, hardware encoding resources to implement encoding of the encoding task.

Embodiments of the present disclosure provide a client. The client includes one or more processors and a memory storing one or more programs executable by the one or more processors to cause the client to: initiate a request for remote desktop creation to a server; receive an image video stream of a remote desktop obtained after encoding according to information reflecting a remote desktop creation requirement from the server; and decode the received image video stream and display the remote desktop.

Embodiments of the present disclosure provide a system for acquiring a remote desktop. The system includes: a server; and one or more clients configured to: initiate a request for remote desktop creation to the server; receive an image video stream of a remote desktop obtained after encoding from the server; and decode the received image video stream and display the remote desktop. The server is configured to: receive the request for the remote desktop creation; determine encoding requirement information of an encoding task according to information reflecting a remote desktop creation requirement; call, according to the encoding requirement information of the encoding task, hardware encoding resources to implement encoding of the encoding task; and transmit the image video stream of the remote desktop obtained after the encoding to the one or more clients.

Embodiments of the present disclosure provide a non-transitory computer-readable storage medium. The non-transitory computer-readable storage medium stores one or more programs executable by one or more processors to cause a server to: receive a request for remote desktop creation; determine encoding requirement information of an encoding task according to information reflecting a remote desktop creation requirement; calling, according to the encoding requirement information of the encoding task, hardware encoding resources provided by a hardware encoding module, to implement encoding of the encoding task; and transmitting image video stream of a remote desktop obtained after the encoding to one or more clients.

Other features and advantages of the present disclosure will be described in the following specification, and partially become apparent from the specification, or be understood through implementation of the present disclosure. Objectives and other advantages of the present disclosure may be achieved and obtained by using the structures particularly mentioned in the specification, the claims, and the accompanying drawings.

BRIEF DESCRIPTION OF THE DRAWINGS

The accompanying drawings are used to provide further understanding of the technical solutions of the present disclosure, and constitute a part of the specification, which are used to explain the technical solutions of the present disclosure in combination with the embodiments of the present disclosure, and do not constitute a limitation to the technical solutions of the present disclosure.

DETAILED DESCRIPTION

Figure 1:
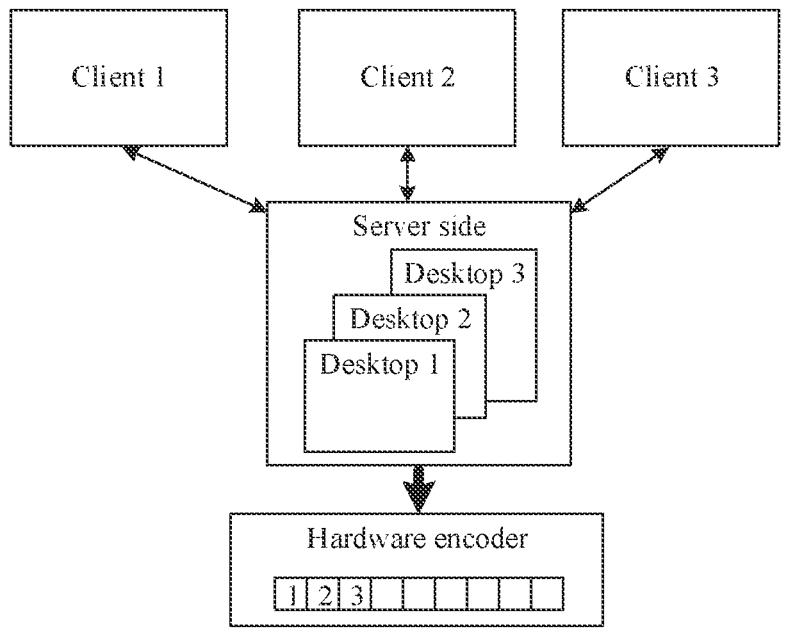
FIG. 1 is a schematic diagram of a typical architecture of a cloud desktop in the related technology.

To describe the objectives, technical solutions, and advantages of the present disclosure more clearly, in the following description, the embodiments of the present disclosure are described in detail with reference to the accompanying drawings. It should be noted that, provided that no conflict is caused, the embodiments in the present disclosure or the features in the embodiments may be mutually combined.

In a typical configuration of the embodiments of the present disclosure, a computing device includes one or more processors (CPUs), an input/output interface, a network interface, and an internal memory.

The internal memory may include forms such as a volatile memory, a random access memory (RAM) or a non-volatile memory in computer-readable media, for example, a read-only memory (ROM) or a flash RAM. The internal memory is an example of the computer-readable medium.

The computer-readable medium may include a persistent medium and a non-persistent medium, a removable medium and a non-removable medium, which may implement storage of information by using any method or technology. The information may be a computer-readable instruction, a data structure, a program module, or other data. Examples of computer storage media include, but are not limited to, a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. As defined herein, the computer readable media do not include transitory computer readable media (transitory media), for example, modulated data signals and carrier waves.

The steps shown in the flowcharts in the accompanying drawings may be performed in, for example, a computer system having a group of computer-executable instructions. In addition, although a logic order is shown in the flowcharts, in some cases, the shown or described steps may be performed in an order different from the order herein.

Embodiments of the present disclosure provide an encoding scheduling method, a server, a client, and a system for acquiring a remote desktop, which can improve a hardware encoding resource utilization and save resources. In the embodiments of the present disclosure, the hardware encoding resources are scheduled according to the encoding requirement information of the encoding task determined based on the information reflecting a remote desktop creation requirement, so that hardware encoding resources unnecessarily occupied are released in time, thereby saving the hardware encoding resources. Moreover, the released hardware encoding resources may be provided for other encoding tasks for use. In other words, both a quantity of concurrent channels and a hardware encoding resource utilization are improved.

Figure 2:
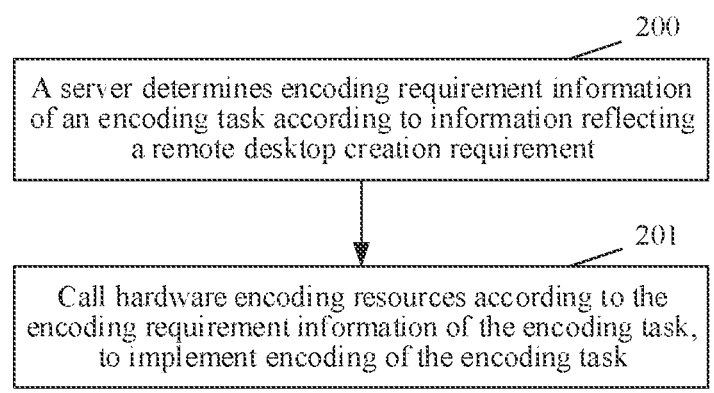
FIG. 2 is a schematic flowchart of an encoding scheduling method according to some embodiments of the present disclosure.

FIG. 2 is a schematic flowchart of an encoding scheduling method according to some embodiments of the present disclosure. As shown in FIG. 2, the method includes step 200 and step 201. In step 200, a server determines encoding requirement information of an encoding task according to information reflecting a remote desktop creation requirement.

In some exemplary embodiments, information reflecting a remote desktop creation requirement may include any one or a combination of the following: remote desktop image quality requirement information, information of a client initiating remote desktop creation, and network transmission quality information.

In some exemplary embodiments, remote desktop image quality requirement information may include updated region information, or user interface elements. The updated region information refers to information of a region in which information update occurs obtained by comparing an image frame transmitted later with an adjacent image frame transmitted earlier. The user interface elements (UI Elements) information may be, for example, text information and image information included in image frames.

In some exemplary embodiments, the information of the client initiating remote desktop creation may include, for example: priority, application information, user configuration information, user event information, etc.

The application information may include, for example, a name of the application, a type of the application, and the like. Whether the application is a popular application may be determined based on the application information.

The user configuration information may be, for example, displaying a user priority, e.g., a higher-priority user.

The user event information may be, for example, user events of the client such as a mouse event, a keyboard event, etc.

In some exemplary embodiments, the network transmission quality information may include network quality-of-service information (Network QoS), such as a quantity of network jitters and a quantity of times of packet loss.

In some exemplary embodiments, encoding requirement information may include: priority information of the encoding task, encoding parameter information, and hardware encoding resource requirement information.

In some exemplary embodiments, the information reflecting a remote desktop creation requirement may include remote desktop image quality requirement information. Step 200 may include: in a case that updated region information indicates that information update occurs in only a partial region when a current image frame is compared with a previous image frame, hardware encoding resource requirement information in the encoding requirement information of the encoding task is to call the hardware encoding resources only according to the updated region information, thereby reducing the use of the hardware encoding resources; and in a case that user interface elements information indicates that a proportion of image information in the current image frame is greater than a preset first threshold, and the image quality can be reduced, the hardware encoding resource requirement information in the encoding requirement information of the encoding task is to reduce the hardware encoding resources. In some embodiments, for example, there may be a reduction of 50%. When the proportion of the image information is greater than the preset first threshold, an image quality quantization parameter value used in encoding in the encoding parameter information may be halved, thereby reducing the hardware encoding resources.

In a case that the update occurs in only a partial region, the use of the hardware encoding resources is reduced when compared with that of the previous image frame. Hardware encoding resources which are unnecessarily occupied can be dynamically released, thereby saving the hardware encoding resources. Moreover, the released hardware encoding resources may be provided for other encoding tasks for use. In other words, the quantity of concurrent channels and the hardware encoding resource utilization are also improved. In a case that the proportion of image information in the image frame is relatively large, because human eyes are less sensitive to the image quality requirement, even if the hardware encoding resources are reduced, the user experience will not be affected. Moreover, the hardware encoding resources which are unnecessarily occupied can be dynamically released, thereby saving the hardware encoding resources. Moreover, the released hardware encoding resources may be provided for other encoding tasks for use. In other words, the quantity of concurrent channels and the hardware encoding resource utilization are also improved.

In some exemplary embodiments, the information reflecting a remote desktop creation requirement includes information of a client initiating remote desktop creation. Step 200 may include that: in a case that application information indicates that an application is a popular application, the encoding requirement information of the encoding task is to raise the priority. In some embodiments, it is assumed that the user is preset with a first priority level, the user event is preset with a second priority level, the popular application is preset with a third priority level, and others, such as a non-popular application and an ordinary user, may be configured with an ordinary priority level, so that the priority can be raised from the ordinary priority level to the third priority level herein.

Step 200 may include that: in a case that user configuration information indicates that the user is a higher-priority user, the encoding requirement information of the encoding task is a higher priority. In some embodiments, it is assumed that the user is preset with a first priority level, the user event is preset with a second priority level, the popular application is preset with a third priority level, and others, such as a non-popular application and an ordinary user, may be configured with an ordinary priority level, so that the priority of a corresponding user can be raised from the ordinary priority level to the first priority level herein.

Step 200 may include that: in a case that user event information indicates that user events of the client, such as a mouse event and a keyboard event, continue to occur within a preset duration, the encoding requirement information of the encoding task event is to raise the priority. In some embodiments, it is assumed that the user is preset with a first priority level, the user event is preset with a second priority level, the popular application is preset with a third priority level, and others, such as a non-popular application and an ordinary user, may be configured with an ordinary priority level, so that the priority can be raised from the ordinary priority level to the second priority level herein.

By raising the priority, it is ensured that the hardware encoding resources are preferentially scheduled to a higher-priority application and a more timely interactive response in the scenario of a user with a higher priority, which improves the user experience to a certain extent. Moreover, it is ensured that a higher-priority encoding task occupies the hardware encoding resources first, and the hardware encoding resource utilization is improved.

In some exemplary embodiments, the information reflecting a remote desktop creation requirement includes network transmission quality information. Step 200 may include that: in a case that the network quality-of-service information of the client indicates that network quality is poor, for example, a quantity of network jitters exceeding a preset second threshold, or a quality of times of packet loss exceeding a preset third threshold, the encoding requirement information of the encoding task is to reduce an output frame rate, which means to reduce the hardware encoding resources.

In the case of poor network quality, even if the hardware encoding resources are allocated according to the requirement of the encoding task and the required output frame rate is ensured, because of packet loss and other problems in a transmission process, a satisfactory remote desktop cannot be created at the client side. Therefore, by releasing unnecessarily occupied hardware encoding resources in this case, sufficient hardware encoding resources can be provided to other clients with good network quality, thereby improving the hardware encoding resource utilization.

In some exemplary embodiments, before step 200, the method may further include: acquiring, by the server, information reflecting a remote desktop creation requirement.

It should be noted that, in a case that the information reflecting a remote desktop creation requirement includes any combination of the foregoing information, a weight may be preset for each piece of information, so that a final priority level or the reduction of the hardware encoding resources can be comprehensively calculated according to the weight. The specific implementation can be achieved by a person skilled in the art based on the description of the embodiments of the present disclosure, and details are not described herein again.

It should be noted that encoding tasks in the embodiments of the present disclosure are all preset with priorities, and also have corresponding hardware encoding resource requirement information. In the description of the specific implementation of step 200, it is only emphasized that the priority needs to be raised or the hardware encoding resources need to be reduced.

In step 201, hardware encoding resources are called according to the encoding requirement information of the encoding task, to implement encoding of the encoding task.

In some exemplary embodiments, step 201 may include: determining hardware encoding resource requirement information according to encoding parameter information in the encoding requirement information; calling the hardware encoding resources according to the determined hardware encoding resource requirement information; and encoding the encoding task according to the priority in descending order in the encoding requirement information.

In some exemplary embodiments, the hardware encoding resources may be provided by a hardware encoder.

Through the method for implementing encoding scheduling provided in embodiments of the present disclosure, the hardware encoding resources are scheduled according to the encoding requirement information of the encoding task determined based on the information reflecting a remote desktop creation requirement, so that hardware encoding resources unnecessarily occupied are released in time, thereby saving the hardware encoding resources. Moreover, the released hardware encoding resources may be provided for other encoding tasks for use. In other words, both the quantity of concurrent channels and the hardware encoding resource utilization are improved.

In some exemplary embodiments, in step 200, in a case that the user interface elements information indicates that a proportion of text information in a current image frame is greater than a preset fourth threshold, the image quality may be improved. In this case, the hardware encoding resource requirement information in the encoding requirement information of the encoding task is to increase the hardware encoding resources. In some embodiments, for example, there may be an increase of 50%. When a proportion of the text information is greater than the preset fourth threshold, an image quality quantization parameter value used in encoding in the encoding parameter information may be increased by, for example, 50%, thereby increasing the hardware encoding resources by, for example, 50%. Correspondingly, step 201 may further include: according to a load status of a current hardware encoding resource and the encoding requirement information of the encoding task, increasing calling of hardware encoding resources when the load status of the current hardware encoding resource is capable of meeting an increased requirement of hardware encoding resources, and performing encoding according to a priority corresponding to the encoding task and then performing transmission.

In some exemplary embodiments, in step 200, in a case that the updated region information indicates that information update occurs in only a partial region when a current image frame is compared with a previous image frame, the image quality of the updated region can also be improved. In this case, hardware encoding resource requirement information in the encoding requirement information of the encoding task is to keep the hardware encoding resources unchanged. Because the unchanged hardware encoding resources at this time are only used for encoding of a changed region, it is also equivalent to improving the image quality quantization parameter, and then improving the image quality. In some embodiments, an improved proportion may be a whole region size or a changed region size. Correspondingly, step 201 may further include: according to a load status of a current hardware encoding resource and the encoding requirement information of the encoding task, increasing calling of hardware encoding resources when the load status of the current hardware encoding resource is capable of meeting an increased requirement of hardware encoding resources, and performing encoding according to a priority corresponding to the encoding task and then performing transmission.

In some exemplary embodiments, in a case that it is determined that the hardware encoding resources are insufficient to complete transmission of the encoding task, the encoding task may be placed in a waiting queue according to the priority until an idle hardware encoding resource is released, and the encoding task is then encoded and transmitted according to the priority in descending order.

In some embodiments of the present disclosure, the whole scheduling process can be implemented in the server, and more channels of encoding tasks can be cached. Moreover, when the hardware encoding resources are running at full load, the throughput can be improved by a time division multiplexing mechanism, and the quantity of concurrent channels supported can be increased, thereby reducing the cost of a single channel to a certain extent.

In some exemplary embodiments, the method further includes: transmitting an image video stream of a remote desktop obtained after the encoding to a client.

The present disclosure further provides a computer-readable storage medium storing computer-executable instructions. The computer-executable instructions can be used for performing any one of the foregoing encoding scheduling methods.

The present disclosure further provides a device for implementing encoding scheduling. The device includes a memory and a processor. The memory stores the instructions executable by the processor to perform steps of any one of the foregoing encoding scheduling methods.

Figure 3:
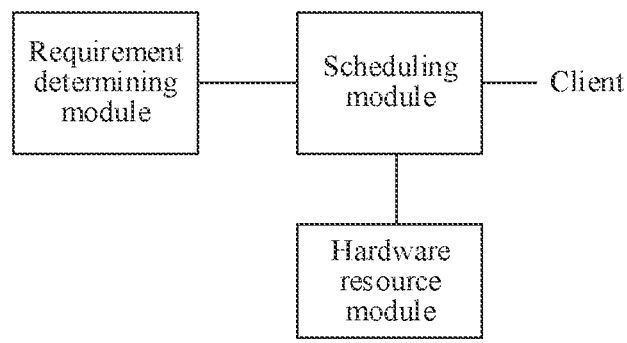
FIG. 3 is a schematic diagram of a component structure of a server according to some embodiments of the present disclosure.

FIG. 3 is a schematic diagram of a component structure of a server according to some embodiments of the present disclosure. As shown in FIG. 3, the server includes a requirement determining module, a scheduling module, and a hardware encoding module providing hardware encoding resources. In some embodiments, the server may include one or more processors and a memory storing one or more programs executable by the one or more processors to cause the server to perform operations of the requirement determining module and the scheduling module.

The requirement determining module is configured to determine encoding requirement information of an encoding task according to information reflecting a remote desktop creation requirement.

The scheduling module is configured to call, according to the encoding requirement information of the encoding task, the hardware encoding resources provided by the hardware encoding module, to implement encoding of the encoding task.

In some exemplary embodiments, the information reflecting a remote desktop creation requirement includes remote desktop image quality requirement information. The requirement determining module is further configured such that: in a case that updated region information indicates that information update occurs in only a partial region when a current image frame is compared with a previous image frame, hardware encoding resource requirement information in the encoding requirement information of the encoding task is to call the hardware encoding resources only according to the updated region information; and in a case that user interface elements information indicates that a proportion of image information in the current image frame is greater than a preset first threshold, and the image quality can be reduced, the hardware encoding resource requirement information in the encoding requirement information of the encoding task is to reduce the hardware encoding resources.

In a case that update occurs in only a partial region, the use of the hardware encoding resources is reduced when compared with that of the previous image frame, and the hardware encoding resources which are unnecessarily occupied can be dynamically released, thereby saving the hardware encoding resources. Moreover, the released hardware encoding resources may be provided for other encoding tasks for use. In other words, both the quantity of concurrent channels and the hardware encoding resource utilization are improved. In a case that the proportion of image information in the image frame is relatively large, because human eyes are less sensitive to the image quality requirement, even if the hardware encoding resources are reduced, the user experience will not be affected. Moreover, the hardware encoding resources which are unnecessarily occupied can be dynamically released, thereby saving the hardware encoding resources. Moreover, the released hardware encoding resources may be provided for other encoding tasks for use. In other words, both the quantity of concurrent channels and the hardware encoding resource utilization are improved.

In some exemplary embodiments, the information reflecting a remote desktop creation requirement includes information of a client initiating remote desktop creation. The requirement determining module is further configured such that: in a case that application information indicates that an application is a popular application, the encoding requirement information of the encoding task is to raise a priority; in a case that user configuration information indicates that a user is a higher-priority user, the encoding requirement information of the encoding task is a higher priority; and in a case that user event information indicates that user events of the client, such as a mouse event and a keyboard event, continue to occur within a preset duration, the encoding requirement information of the encoding task is to raise the priority.

By raising the priority, it is ensured that the hardware encoding resources are preferentially scheduled to a higher-priority application and a more timely interactive response in the scenario of a user with a higher priority, which improves the user experience to a certain extent. Moreover, it is ensured that a higher-priority encoding task occupies the hardware encoding resources first, and the hardware encoding resource utilization is improved.

In some exemplary embodiments, the information reflecting a remote desktop creation requirement includes network transmission quality information. The requirement determining module is further configured such that: in a case that the network quality-of-service information of the client indicates that network quality is poor, for example, a quantity of network jitters exceeding a preset second threshold, or a quality of times of packet loss exceeding a preset third threshold, the encoding requirement information of the encoding task is to reduce an output frame rate, which means to reduce the hardware encoding resources.

In some exemplary embodiments, a hardware encoding module may be a hardware encoder.

In the case of poor network quality, even if the hardware encoding resources are allocated according to the requirement of the encoding task and the required output frame rate is ensured, because of packet loss and other problems in a transmission process, a satisfactory remote desktop cannot be created at the client side. Therefore, by releasing unnecessarily occupied hardware encoding resources in this case, sufficient hardware encoding resources can be provided to other clients with good network quality, thereby improving the hardware encoding resource utilization.

In some exemplary embodiments, the scheduling module is further configured to: determine hardware encoding resource requirement information according to encoding parameter information; call the hardware encoding resources according to the determined hardware encoding resource requirement information; and encode the encoding task according to the priority in descending order.

In some exemplary embodiments, the scheduling module is further configured to: transmit an image video stream of a remote desktop obtained after the encoding to a client.

In some exemplary embodiments, the requirement determining module is further configured such that: in a case that the user interface elements information indicates that a proportion of text information in a current image frame is greater than a preset fourth threshold, the image quality may be improved. In this case, the hardware encoding resource requirement information in the encoding requirement information of the encoding task is to increase the hardware encoding resources.

Correspondingly, the scheduling module is further configured to: according to a load status of aa current hardware encoding resource and the encoding requirement information of the encoding task, increase calling of hardware encoding resources when a load status of a current hardware encoding resource is capable of meeting an increased requirement of hardware encoding resources, and perform the encoding according to a priority corresponding to the encoding task and then perform the transmission.

In some exemplary embodiments, the requirement determining module is further configured such that: in a case that the updated region information indicates that information update occurs in only a partial region when a current image frame is compared with a previous image frame, the image quality of the updated region can also be improved. Therefore, in this case, the encoding requirement information of the encoding task is to keep the hardware encoding resources unchanged.

Correspondingly, the scheduling module is further configured to: according to the load status of the current hardware encoding resource and the encoding requirement information of the encoding task, increase calling of hardware encoding resources when a load status of a current hardware encoding resource is capable of meeting an increased requirement of hardware encoding resources, and perform the encoding according to a priority corresponding to the encoding task and then perform the transmission.

In some exemplary embodiments, the scheduling module is further configured such that: in a case that it is determined that the hardware encoding resources are insufficient to complete transmission of the encoding task, the encoding task may be placed in a waiting queue according to the priority until an idle hardware encoding resource is released, and then the encoding task is encoded and transmitted according to the priority in descending order.

In some embodiments of the present disclosure, the whole scheduling process can be implemented in the server, and more channels of encoding tasks can be cached. Moreover, when the hardware encoding resources are running at full load, the throughput is improved by a time division multiplexing mechanism, and the quantity of concurrent channels supported can be increased, thereby reducing the cost of a single channel to a certain extent.

Some embodiments of the present disclosure further provide a client. The client may include one or more processors and a memory storing one or more programs executable by the one or more processors to cause the client to: initiate a request for remote desktop creation to a server; receive an image video stream of a remote desktop obtained after encoding according to information reflecting a remote desktop creation requirement from the server; and decode the received image video stream and display the remote desktop.

Figure 4:
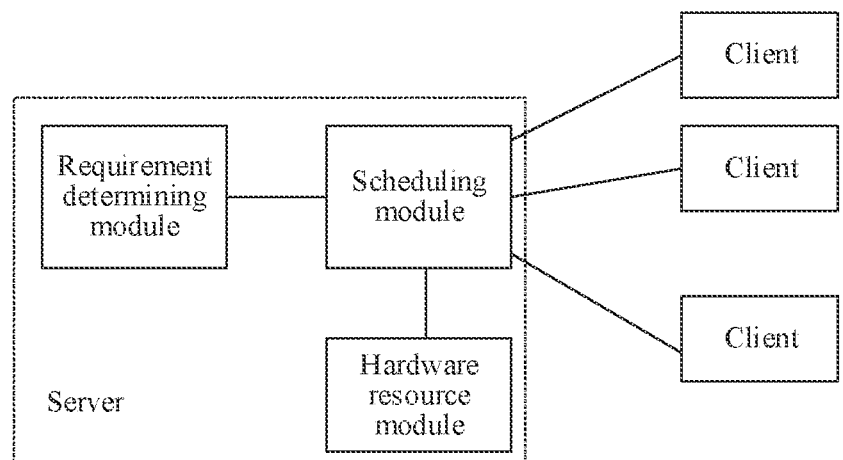
FIG. 4 is a schematic architectural diagram of a system for acquiring a remote desktop according to some embodiments of the present disclosure.

FIG. 4 is a schematic architectural diagram of a system for acquiring a remote desktop according to some embodiments of the present disclosure. As shown in FIG. 4, the system includes a server and one or more clients.

The one or more clients may include one or more processors and a memory storing one or more programs executable by the one or more processors to cause the client to: initiate a request for remote desktop creation to the server; receive an image video stream of a remote desktop obtained after encoding from the server; and decode the received image video stream and display the remote desktop.

The server may include one or more processors and a memory storing one or more programs executable by the one or more processors to cause the server to: receive the request for remote desktop creation, determine encoding requirement information of an encoding task according to information reflecting a remote desktop creation requirement; call, according to the encoding requirement information of the encoding task, hardware encoding resources provided by a hardware encoding module, to implement encoding of the encoding task; and transmit the image video stream of the remote desktop obtained after the encoding to the one or more clients.

In some exemplary embodiments, the server in the system for implementing encoding scheduling includes any one of the servers shown in FIG. 3.

A person of ordinary skill in the art may understand that all or some steps of the methods in the foregoing embodiments may be implemented by a program instructing relevant hardware in the server or client(s). The program may be stored in a transitory or non-transitory computer-readable storage medium. The storage medium may include a flash disk, a read-only memory (ROM), a random access memory (RAM), a magnetic disk, an optical disc, and the like. Some embodiments of the present disclosure further provide a transitory or non-transitory computer-readable storage medium. Optionally, in some embodiments, the storage medium may be configured to store one or more programs executable by one or more processors to cause a server or one or more clients to perform any of the encoding scheduling methods provided in the foregoing embodiments.

In practical application scenarios of the cloud desktop and the cloud application, in some embodiments of the present disclosure, the priority of using the hardware encoding resources for each channel and encoding parameter(s) such as a frame rate are calculated according to a request of the client. Then, a corresponding frame rate and the hardware encoding resources are applied for allocation from a hardware accelerator card according to the priority of each channel. The encoding parameter(s) can be transmitted to the hardware encoder for encoding to obtain the image video stream of the remote desktop. In this way, the working time or calculation time of the hardware accelerator card may achieve a better utilization under a full load condition. Moreover, the time from receiving the encoding to completing the encoding by the server preferentially satisfy the encoding task with a higher priority, which reduces the response time and improves processing efficiency for the encoding task. When the frame rate or updated region of the cloud desktop and the cloud application changes, the hardware accelerator card can reallocate the hardware encoding resources according to the changed frame rate and region size, so that the quantity of concurrent channels supported in a unit time can be increased and the throughput rate can be improved.

In some exemplary embodiments, assuming that the client initiates a request for remote desktop creation, and the server determines, according to the user configuration information, that the user corresponding to the client initiating the request is a higher-priority user, then the server improves the priority of the user from the ordinary priority level to the first priority level. That is, the encoding requirement information of the encoding task is the first priority level. In this way, the server first allocates required hardware encoding resources based on the request of the user according to the encoding parameter information, and first encodes the encoding task, and then transmits the image video stream of the remote desktop obtained after the encoding to the client. For the client, efficient remote desktop creation is implemented, which improves the user experience.

In some exemplary embodiments, assuming that in the process of using the created remote desktop at the client, the server learns, according to the user event information, that the user event of the client, for example, a mouse event, continues to occur within a preset time duration, the server improves the priority of the user. Assuming that the user event is preset with the second priority level, then the server allocates the required hardware encoding resources according to the second priority level to process the user event of the user. In this way, for the client, efficient remote desktop response is implemented and the user experience is improved.

In some exemplary embodiments, at the client, the user can set the priority level of an application that the user considers to be important, favorite, or commonly used through a preset interface, and inform the server through a request, so that the server can first consider information from the client when scheduling the hardware encoding resources. In this way, a personalized requirement of the user is also ensured.

In some exemplary embodiments, information such as image quality information of a remote desktop currently displayed, network transmission information, a current user, a priority of an application may further be displayed to the user at the client. In this way, the user can have an intuitive perception of remote desktop processing currently displayed, and can also learn quantified quality information. It should be noted that, the information displayed to the user may be in a manner easily understood. For example, the network quality may be ranked as: good, very good, and poor to inform the user of the current network quality. In another example, the image quality of the displayed remote desktop may be ranked as: higher quality, normal quality, and lower quality, so that the user can be clear of the current obtained remote desktop quality at a glance. In a case that the user feels that the current remote desktop quality is poor, the user can make a request again for a re-creation. At this time, the user can raise the priority of the application or the priority of the user, so that more hardware encoding resources are allocated, thereby acquiring a better remote desktop.

The embodiments may further be described using the following clauses:
1. An encoding scheduling method, comprising:
    determining, by a server, encoding requirement information of an encoding task according to information reflecting a remote desktop creation requirement; and
    calling hardware encoding resources according to the encoding requirement information of the encoding task, to implement encoding of the encoding task.
2. The encoding scheduling method of clause 1, wherein the information reflecting the remote desktop creation requirement comprises any one or a combination of the following: remote desktop image quality requirement information, information of a client initiating remote desktop creation, and network transmission quality information.

3. The encoding scheduling method of clause 2, wherein the remote desktop image quality requirement information comprises any one or a combination of the following:
updated region information used for representing a region in which information update occurs obtained by comparing an image frame transmitted later with an adjacent image frame transmitted earlier; and
user interface elements information used for representing text information and image information comprised in image frames.

4. The encoding scheduling method of clause 3, wherein the determining the encoding requirement information of the encoding task comprises:
in a case that the updated region information indicates that information update occurs in a partial region when a current image frame is compared with a previous image frame, determining hardware encoding resource requirement information in the encoding requirement information of the encoding task to be calling the hardware encoding resources according to the updated region information; and
in a case that the user interface elements information indicates that a proportion of image information in the current image frame is greater than a preset first threshold, determining the hardware encoding resource requirement information in the encoding requirement information of the encoding task to be reducing the hardware encoding resources.

5. The encoding scheduling method of clause 2, wherein the information of the client initiating remote desktop creation comprises any one or a combination of the following:
application information used for determining whether an application is a popular application;
user configuration information used for displaying a priority of a user; and
user event information used for representing a user event of the client.

6. The encoding scheduling method of clause 5, wherein the determining the encoding requirement information of the encoding task comprises:
in a case that the application information indicates that the application is a popular application, determining the encoding requirement information of the encoding task to be raising the priority;
in a case that the user configuration information indicates that the user is a higher-priority user, determining the encoding requirement information of the encoding task is a higher priority; and
in a case that the user event information indicates that the user event of the client continues to occur within a preset duration, determining the encoding requirement information of the encoding task to be raising the priority.

7. The encoding scheduling method of clause 2, wherein the network transmission quality information comprises network quality-of-service information; and
the determining the encoding requirement information of the encoding task comprises:
in a case that the network quality-of-service information of the client indicates that network quality is poor, determining hardware encoding resource requirement information in the encoding requirement information of the encoding task to be reducing the hardware encoding resources.

8. The encoding scheduling method of clause 3, wherein the determining the encoding requirement information of the encoding task further comprises:
in a case that the user interface elements information indicates that a proportion of text information in a current image frame is greater than a preset fourth threshold, determining hardware encoding resource requirement information in the encoding requirement information of the encoding task to be increasing the hardware encoding resources; and
the determining the encoding requirement information of the encoding task further comprises:
according to a load status of a current hardware encoding resource and the encoding requirement information of the encoding task, increasing calling of the hardware encoding resources to perform transmission according to a priority corresponding to the encoding task when the load status of the current hardware encoding resource is capable of meeting an increased requirement of the hardware encoding resources.

9. The encoding scheduling method of clause 3, wherein the determining the encoding requirement information of the encoding task further comprises:
in a case that the updated region information indicates that information update occurs in a partial region when a current image frame is compared with a previous image frame, determining hardware encoding resource requirement information in the encoding requirement information of the encoding task to be maintaining the hardware encoding resources unchanged; and
the determining the encoding requirement information of the encoding task further comprises:
according to a load status of a current hardware encoding resource and the encoding requirement information of the encoding task, increasing calling of the hardware encoding resources to perform transmission according to a priority corresponding to the encoding task when the load status of the current hardware encoding resource is capable of meeting an increased requirement of hardware encoding resources.

10. The encoding scheduling method of any of clauses 1-9, wherein the encoding requirement information comprises: priority information, encoding parameter information, and hardware encoding resource requirement information of the encoding task.

11. The encoding scheduling method of clause 10, wherein the calling the hardware encoding resources according to the encoding requirement information of the encoding task comprises:
determining the hardware encoding resource requirement information according to the encoding parameter information;
calling the hardware encoding resources according to the hardware encoding resource requirement information; and
encoding the encoding task according to the priority in descending order.

12. The encoding scheduling method of clause 1, further comprising: transmitting an image video stream of a remote desktop obtained after the encoding to a client.

13. A server, comprising:
one or more processors; and
a memory storing one or more programs executable by the one or more processors to cause the server to:

determine encoding requirement information of an encoding task according to information reflecting a remote desktop creation requirement; and call, according to the encoding requirement information of the encoding task, hardware encoding resources to implement encoding of the encoding task.

14. The server of clause 13, wherein the information reflecting the remote desktop creation requirement comprises any one or a combination of the following: remote desktop image quality requirement information, information of a client initiating remote desktop creation, and network transmission quality information.

15. The server of clause 14, wherein the information reflecting the remote desktop creation requirement comprises any one or a combination of the following:

updated region information used for representing a region in which information update occurs obtained by comparing an image frame transmitted later with an adjacent image frame transmitted earlier; and user interface elements information used for representing text information and image information in image frames;

application information used for determining whether an application is a popular application;

user configuration information used for displaying a priority of a user;

user event information used for representing a user event of the client; and network quality-of-service information.

16. The server of clause 13, wherein the one or more programs are executable by the one or more processors to further cause the server to:

determine hardware encoding resource requirement information according to encoding parameter information;

call the hardware encoding resources according to the hardware encoding resource requirement information; and encode the encoding task according to the priority in descending order.

17. The server of clause 16, wherein the one or more programs are executable by the one or more processors to further cause the server to:

transmit an image video stream of a remote desktop obtained after the encoding to a client.

18. The server of clause 13, wherein the server comprises a hardware encoder providing the hardware encoding resources.

19. A client, comprising:

one or more processors; and a memory storing one or more programs executable by the one or more processors to cause the client to:

initiate a request for remote desktop creation to a server;

receive an image video stream of a remote desktop obtained after encoding according to information reflecting a remote desktop creation requirement from the server; and decode the received image video stream and display the remote desktop.

20. A system for acquiring a remote desktop, comprising:

a server; and one or more clients configured to:

initiate a request for remote desktop creation to the server;

receive an image video stream of a remote desktop obtained after encoding from the server; and decode the received image video stream and display the remote desktop; and wherein the server is configured to:

receive the request for the remote desktop creation;

determine encoding requirement information of an encoding task according to information reflecting a remote desktop creation requirement;

call, according to the encoding requirement information of the encoding task, hardware encoding resources to implement encoding of the encoding task; and transmit the image video stream of the remote desktop obtained after the encoding to the one or more clients.

21. The system of clause 20, wherein the server comprises:

a hardware encoding module providing the hardware encoding resources;

a requirement determining module configured to determine the encoding requirement information of the encoding task according to the information reflecting the remote desktop creation requirement; and a scheduling module configured to call, according to the encoding requirement information of the encoding task, the hardware encoding resources provided by the hardware encoding module, to implement the encoding of the encoding task.

22. A non-transitory computer-readable storage medium that stores one or more programs executable by one or more processors to cause a server to:

receive a request for remote desktop creation;

determine encoding requirement information of an encoding task according to information reflecting a remote desktop creation requirement;

calling, according to the encoding requirement information of the encoding task, hardware encoding resources provided by a hardware encoding module, to implement encoding of the encoding task; and transmitting image video stream of a remote desktop obtained after the encoding to one or more clients.

23. The non-transitory computer-readable storage medium of clause 22, wherein the one or more programs are executable by the one or more processors to cause one or more clients to:

initiate the request for the remote desktop creation to the server; and receive the image video stream of the remote desktop obtained after the encoding from the server.

Although the implementations of the present disclosure have been disclosed as above, the described content is only implementations used for ease of understanding the present disclosure and is not intended to limit the present disclosure. A person skilled in the field of the present disclosure can make any modification and change in the forms and details of the implementation without departing from the spirit and scope of the present disclosure. The protection scope of the present disclosure should still be subject to the scope defined by the appended claims.

What is claimed is:

1. An encoding scheduling method, comprising:

determining, by a server, encoding requirement information of an encoding task according to information reflecting a remote desktop creation requirement, wherein the information reflecting the remote desktop creation requirement comprises remote desktop image quality requirement information comprising user interface elements information used for representing text information and image information comprised in image frames; and calling hardware encoding resources according to the encoding requirement information of the encoding task, to implement encoding of the encoding task;

wherein operations of determining the encoding requirement information of the encoding task comprise:
in a case that the user interface elements information indicates that a proportion of image information in a current image frame is greater than a preset first threshold, determining hardware encoding resource requirement information in the encoding requirement information of the encoding task to be reducing the hardware encoding resources.

2. The encoding scheduling method of claim 1, wherein the information reflecting the remote desktop creation requirement further comprises any one or a combination of the following: information of a client initiating remote desktop creation, and network transmission quality information.

3. The encoding scheduling method of claim 2, wherein the remote desktop image quality requirement information further comprises:
updated region information used for representing a region in which information update occurs obtained by comparing an image frame transmitted later with an adjacent image frame transmitted earlier.

4. The encoding scheduling method of claim 3, wherein the determining the encoding requirement information of the encoding task comprises:
in a case that the updated region information indicates that information update occurs in a partial region when the current image frame is compared with a previous image frame, determining the hardware encoding resource requirement information in the encoding requirement information of the encoding task to be calling the hardware encoding resources according to the updated region information.

5. The encoding scheduling method of claim 2, wherein the information of the client initiating remote desktop creation comprises any one or a combination of the following:
application information used for determining whether an application is a popular application;
user configuration information used for displaying a priority of a user; and
user event information used for representing a user event of the client.

6. The encoding scheduling method of claim 5, wherein the determining the encoding requirement information of the encoding task comprises:
in a case that the application information indicates that the application is a popular application, determining the encoding requirement information of the encoding task to be raising the priority;
in a case that the user configuration information indicates that the user is a higher-priority user, determining the encoding requirement information of the encoding task is a higher priority; and
in a case that the user event information indicates that the user event of the client continues to occur within a preset duration, determining the encoding requirement information of the encoding task to be raising the priority.

7. The encoding scheduling method of claim 2, wherein the network transmission quality information comprises network quality-of-service information; and the determining the encoding requirement information of the encoding task comprises:
in a case that the network quality-of-service information of the client indicates that network quality is poor, determining hardware encoding resource requirement information in the encoding requirement information of the encoding task to be reducing the hardware encoding resources.

8. The encoding scheduling method of claim 3, wherein the determining the encoding requirement information of the encoding task further comprises:
in a case that the user interface elements information indicates that a proportion of text information in the current image frame is greater than a preset fourth threshold, determining hardware encoding resource requirement information in the encoding requirement information of the encoding task to be increasing the hardware encoding resources; and
the determining the encoding requirement information of the encoding task further comprises:
according to a load status of a current hardware encoding resource and the encoding requirement information of the encoding task, increasing calling of the hardware encoding resources to perform transmission according to a priority corresponding to the encoding task when the load status of the current hardware encoding resource is capable of meeting an increased requirement of the hardware encoding resources.

9. The encoding scheduling method of claim 3, wherein the determining the encoding requirement information of the encoding task further comprises:
in a case that the updated region information indicates that information update occurs in a partial region when the current image frame is compared with a previous image frame, determining hardware encoding resource requirement information in the encoding requirement information of the encoding task to be maintaining the hardware encoding resources unchanged; and
the determining the encoding requirement information of the encoding task further comprises:
according to a load status of a current hardware encoding resource and the encoding requirement information of the encoding task, increasing calling of the hardware encoding resources to perform transmission according to a priority corresponding to the encoding task when the load status of the current hardware encoding resource is capable of meeting an increased requirement of hardware encoding resources.

10. The encoding scheduling method of claim 1, wherein the encoding requirement information comprises: priority information, encoding parameter information, and hardware encoding resource requirement information of the encoding task.

11. The encoding scheduling method of claim 10, wherein the calling the hardware encoding resources according to the encoding requirement information of the encoding task comprises:
determining the hardware encoding resource requirement information according to the encoding parameter information;
calling the hardware encoding resources according to the hardware encoding resource requirement information; and
encoding the encoding task according to the priority in descending order.

12. The encoding scheduling method of claim 1, further comprising:

transmitting an image video stream of a remote desktop obtained after the encoding to a client.

13. A server, comprising:
one or more processors; and
a memory storing one or more programs executable by the one or more processors to cause the server to:
determine encoding requirement information of an encoding task according to information reflecting a remote desktop creation requirement, wherein the information reflecting the remote desktop creation requirement comprises remote desktop image quality requirement information comprising user interface elements information used for representing text information and image information comprised in image frames; and
call, according to the encoding requirement information of the encoding task, hardware encoding resources to implement encoding of the encoding task;
wherein operations of determining the encoding requirement information of the encoding task comprise: in a case that the user interface elements information indicates that a proportion of image information in a current image frame is greater than a preset first threshold, determining hardware encoding resource requirement information in the encoding requirement information of the encoding task to be reducing the hardware encoding resources.

14. The server of claim 13, wherein the information reflecting the remote desktop creation requirement further comprises any one or a combination of the following: information of a client initiating remote desktop creation, and network transmission quality information.

15. The server of claim 14, wherein the information reflecting the remote desktop creation requirement further comprises any one or a combination of the following:
updated region information used for representing a region in which information update occurs obtained by comparing an image frame transmitted later with an adjacent image frame transmitted earlier;
application information used for determining whether an application is a popular application;
user configuration information used for displaying a priority of a user;
user event information used for representing a user event of the client; and
network quality-of-service information.

16. The server of claim 13, wherein the one or more programs are executable by the one or more processors to further cause the server to:
determine hardware encoding resource requirement information according to encoding parameter information;
call the hardware encoding resources according to the hardware encoding resource requirement information; and
encode the encoding task according to the priority in descending order.

17. The server of claim 16, wherein the one or more programs are executable by the one or more processors to further cause the server to:
transmit an image video stream of a remote desktop obtained after the encoding to a client.

18. The server of claim 13, wherein the server comprises a hardware encoder providing the hardware encoding resources.

19. A non-transitory computer-readable storage medium that stores one or more programs executable by one or more processors to cause a server to:
receive a request for remote desktop creation;
determine encoding requirement information of an encoding task according to information reflecting a remote desktop creation requirement, wherein the information reflecting the remote desktop creation requirement comprises remote desktop image quality requirement information comprising user interface elements information used for representing text information and image information comprised in image frames;
calling, according to the encoding requirement information of the encoding task, hardware encoding resources provided by a hardware encoding module, to implement encoding of the encoding task; and
transmitting image video stream of a remote desktop obtained after the encoding to one or more clients;
wherein operations of determining the encoding requirement information of the encoding task comprise:
in a case that the user interface elements information indicates that a proportion of image information in a current image frame is greater than a preset first threshold, determining hardware encoding resource requirement information in the encoding requirement information of the encoding task to be reducing the hardware encoding resources.

20. The non-transitory computer-readable storage medium of claim 19, wherein the one or more programs are executable by the one or more processors to cause one or more clients to:
initiate the request for the remote desktop creation to the server; and
receive the image video stream of the remote desktop obtained after the encoding from the server.

* * * * *